United States Patent
Ishigaki et al.

(10) Patent No.: US 7,065,320 B2
(45) Date of Patent: Jun. 20, 2006

(54) SATELLITE SIGNAL RECEIVER

(75) Inventors: Toshihiro Ishigaki, Yokohama (JP); Akifumi Miyano, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 309 days.

(21) Appl. No.: 10/693,968

(22) Filed: Oct. 28, 2003

(65) Prior Publication Data

US 2004/0087267 A1 May 6, 2004

Related U.S. Application Data

(62) Division of application No. 09/987,873, filed on Nov. 16, 2001, now Pat. No. 6,686,877.

(30) Foreign Application Priority Data

Nov. 16, 2000 (JP) .............................. 2000-349351

(51) Int. Cl.
H04B 7/185 (2006.01)

(52) U.S. Cl. .................... 455/12.1; 455/427; 455/13.4; 342/357.12

(58) Field of Classification Search .............. 455/3.01, 455/11.1, 12.1, 13.2, 13.4, 572, 115.3, 427, 455/420; 342/357.12, 357.15, 357

See application file for complete search history.

(56) References Cited

U.S. PATENT DOCUMENTS

| | | | | |
|---|---|---|---|---|
| 5,448,773 | A | * 9/1995 | McBurney et al. | 455/343.6 |
| 5,592,173 | A | 1/1997 | Lau et al. | 342/357.12 |
| 5,703,598 | A | 12/1997 | Emmons | 342/357.07 |
| 6,121,921 | A | 9/2000 | Ishigaki | 342/357.08 |
| 6,686,877 | B1 * | 2/2004 | Ishigaki et al. | 342/357.12 |

FOREIGN PATENT DOCUMENTS

| | | |
|---|---|---|
| JP | 08-304526 | 11/1996 |
| JP | 10-20014 A | 1/1998 |

* cited by examiner

Primary Examiner—Quochien B. Vuong
Assistant Examiner—Tan Trinh
(74) Attorney, Agent, or Firm—Steptoe & Johnson LLP

(57) ABSTRACT

A satellite signal receiver includes a satellite signal reception unit, timer, and power-on/off controlling element. The satellite signal reception unit calculates a current position of the satellite signal receiver using an electric wave from a satellite, in response to a positioning request. The timer is used to clock an elapsed time in calculating the current position of this receiver. The power-on/off controlling element controls an on/off state of power supplied to both the satellite signal reception unit and the timer on the basis of information including the positioning request, the elapsed time clocked by the timer, and a reception condition of the satellite signal reception unit. Accordingly, a period of time for supplying the power is automatically turned on/off to be shortened in cases the positioning is impossible, thus the power being saved.

5 Claims, 10 Drawing Sheets

SATELLITE SIGNAL RECEIVER

This is a divisional of application Ser. No. 09/987,873 filed Nov. 16, 2001 now U.S. Pat. No. 6,686,877, now allowed.

BACKGROUND OF THE INVENTION

1. The Field of the Invention

The present invention relates to a satellite signal receiver, and in particular, to a power controller for a satellite signal receiver used for devices, such as mobile terminals or mobile phones, that have a satellite signal reception unit.

2. Related Art

One conventional satellite signal receiver is known by Japanese Patent Laid-open Publication No. 8-304526, of which configuration is illustrated by FIG. 1.

The satellite signal receiver shown in FIG. 1 includes a positional information generator 1, operational command receiver 2, power supply 3, and power switching unit 4 that turns on or off power of the positional information generator 1.

The positional information generator 1 is equipped with an receiving antenna 5 for receiving electric waves that has been transmitted from satellites, satellite receiver 6, positional data output circuit 7, and transmitting antenna 8. The satellite receiver 6 demodulates a signal of the received electric waves to computes a current position of this apparatus. The operational command receiver 2 includes a receiving antenna 9 for receiving in wireless an operational command that has been received from the manager, and a reception circuit 10 via the receiving antenna 9.

When the receiver is in operation, only the power of the operational command receiver 2 is turned on to wait for receiving an operational command from the manager. When the manager transmits an operational command, the operational command receiver 2 receives the operational command and activates the power switching unit 4 so that it turns on. This unit 4 operates to supply the power from a power supply 3 to each element of the positional information generator 1, so that each element is energized. The satellite receiver 6 demodulates each satellite signal supplied from the antenna 5 in such a manner that a current position of this receiver is computed based on the signals from a plurality of satellites. The computed positional data are the subject to demodulation in the positional data output circuit 7, before being sent to the manager via the transmission antenna 8.

After the positional information generator 1 generates positional data, the power switching unit 4 will be kept to be on for a certain time, intermittently, or until receiving a command for stopping the operation. During the period of the on-state of the power switching unit 4, the generator 4 generates positional data.

According to this satellite signal receiver, if there is no need for demands for positional information, powering a main part of the apparatus is stopped, while the power is prepared whenever it is necessary. Hence consumption of useless power is suppressed.

However, the foregoing satellite signal receiver is configured so that an external command controls the turn on/off of power of the satellite receiver 6. Therefore, even when this receiving apparatus is located such that it is impossible for this apparatus to receive satellite electric waves or it is extremely difficult for this apparatus to perform such reception, thereby positioning being impossible, the external command causes the satellite receiver to be activated. This results in that the power is consumed uselessly.

SUMMARY OF THE INVENTION

An object of the present invention is to provide, with due consideration to the drawback of such a conventional satellite signal receiver, a power supply controller for a satellite signal receiver, which is able to control operational conditions of a satellite receiver depending on positioning conditions.

In order to accomplish the above object, the present invention provides satellite signal receiver comprising: a satellite signal reception unit for calculating a current position of the satellite signal receiver using an electric wave from a satellite, in response to a positioning request; a timer for clocking an elapsed time in calculating the current position of the satellite signal receiver; and power-on/off controlling means for controlling an on/off state of power supplied to both the satellite signal reception unit and the timer on the basis of information including the positioning request, the elapsed time clocked by the timer, and a condition under which the satellite signal reception unit receives the signal from the satellite.

Preferably, the power-on/off controlling means includes: switch means for switching on or off the power supplied to both the satellite signal reception unit and the timer; and control means for controlling turn on/off operations of the switch means based on the information. It is also preferred that the information about the condition is information about the number of ephemerides. In this case, preferably, the control means includes first control means for turning on the switch means in response to the positioning request, setting means for adjustably setting a period of active time counted from a first time instant at which the switch means turns on to a second time instant at which the satellite signal reception unit calculates the current position, and second control means for turning off the switch means when the elapsed time reaches the period of active time. By way of example, the setting means is configured so that larger the less the number of ephemerides, the larger the period of active time.

Still preferably, the information about the condition is information about an elapsed time from the last calculation of the current position.

As a further configuration according to the present invention, there is provided a satellite signal receiver comprising: a satellite signal reception unit for intermittently calculating a current position of the satellite signal receiver at adjustable intermittent intervals by using an electric wave from a satellite; a timer for clocking an elapsed time every time when the current position of the satellite signal receiver is calculated; and power-on/off controlling means for intermittently controlling an on/off state of power supplied to the satellite signal reception unit on the basis of information including the elapsed time clocked by the timer every time when the current position of the satellite signal receiver is calculated.

According to the above constructions, the power supplied to both the satellite signal reception unit and the timer, or to the satellite signal reception unit is turned on in response to a positioning request issued or at intermittent intervals. During such supply of the power, the power can be turned on/off to control a period of time for supplying the power or intermittent intervals for supplying the power, according to information held by the satellite signal reception unit or its receiving condition. Thus, in cases the satellite signal receiver is placed at situations in which the positioning is impossible, the time for supplying of the power is shortened to avoid useless consumption of the power.

DETAILED DESCRIPTION OF THE PREFERRED EMBODIMENTS

Embodiments of the present invention will now be described in conjunction with the appended drawings.

First Embodiment

Figure 1:
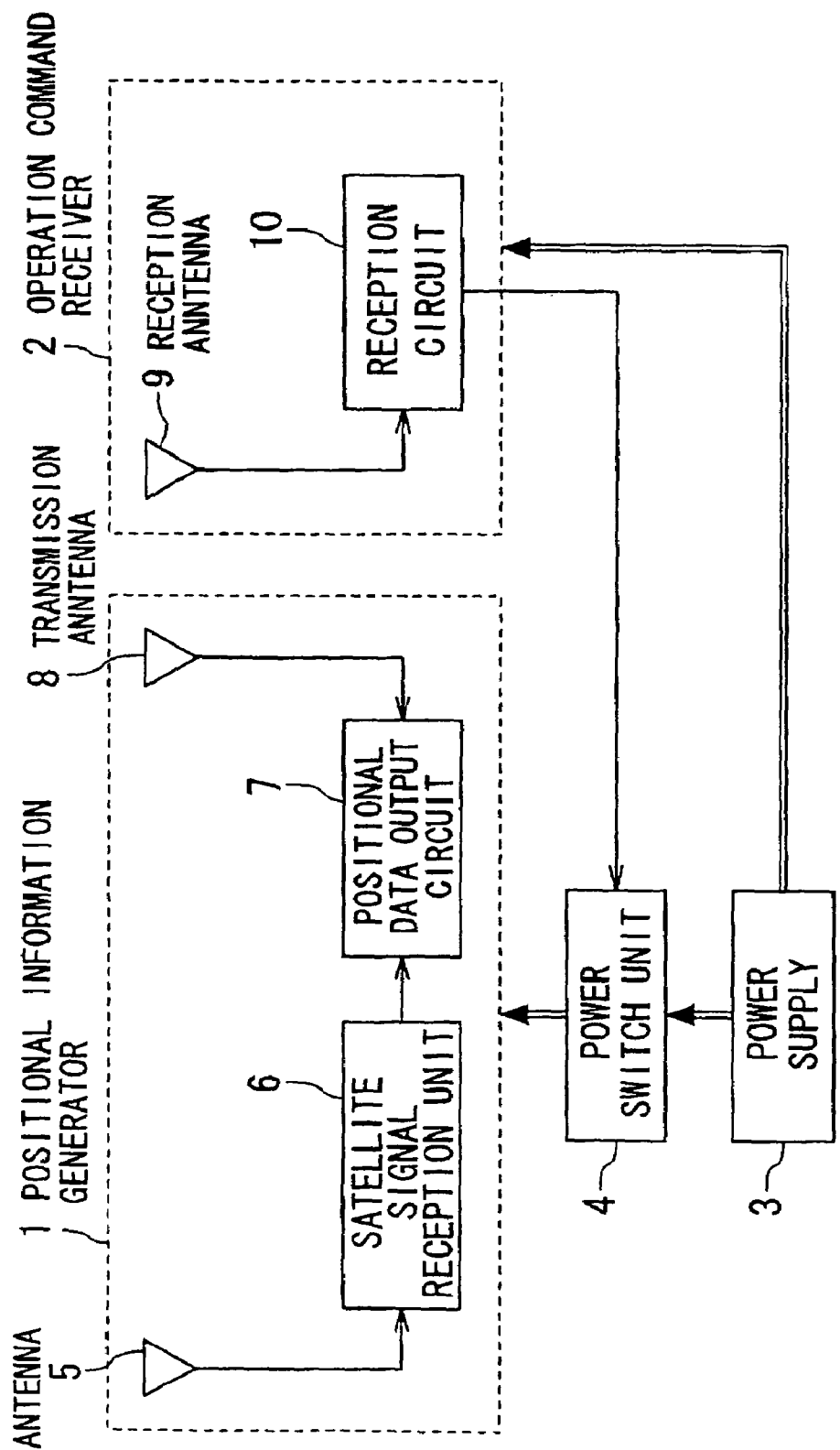
FIG. 1 is a block diagram showing the configuration of a conventional satellite signal receiver.
Figure 2:
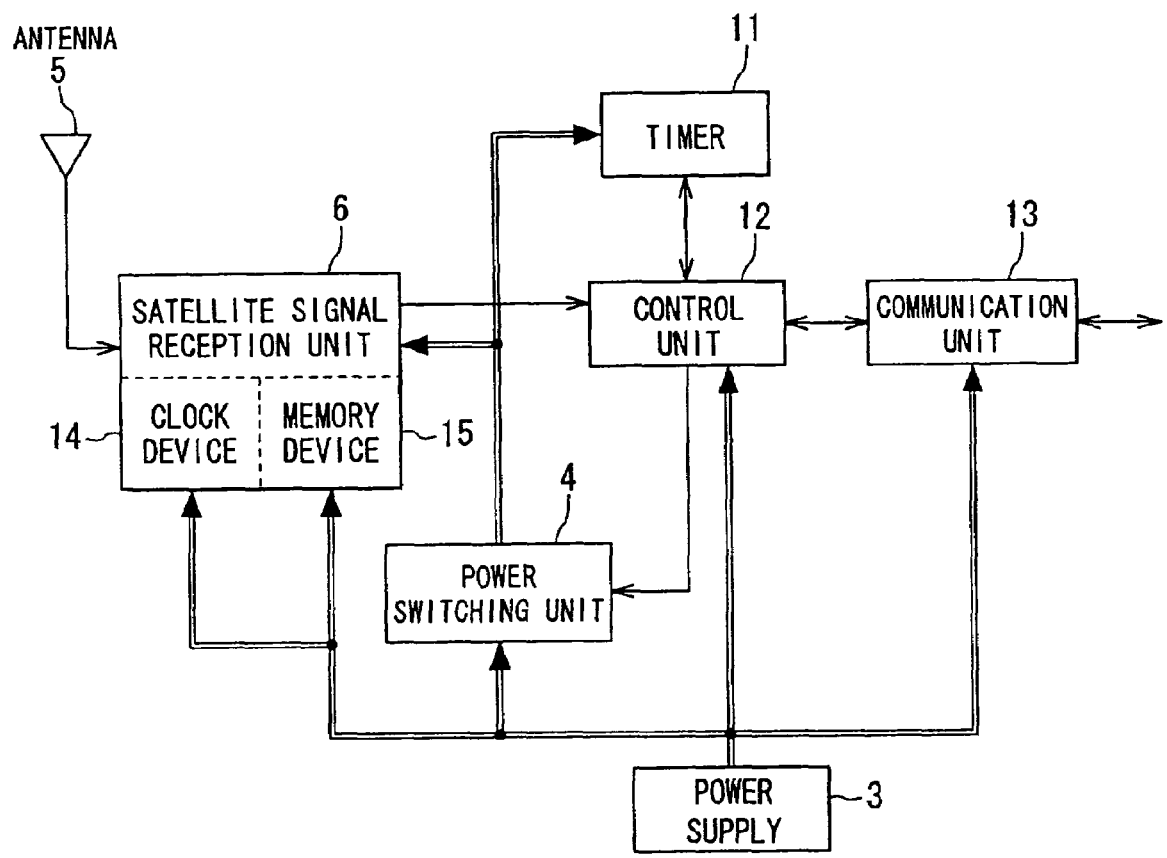
FIG. 2 is a block diagram showing the configuration of a satellite signal receiver employed in a first to fifth embodiments of the present invention.

FIG. 2 is a block diagram showing the configuration of a satellite signal receiver in accordance a first embodiment of the present invention. Incidentally, a satellite signal receiver used in a second to fifth embodiments, which will be described later, also adopt the identical configuration to that shown in FIG. 2.

As shown in FIG. 2, the satellite signal receiver is equipped with an antenna 5, satellite signal reception unit 6, timer 11, communication unit 13, power supply 3, power switching unit 4, and control unit 12.

Among these constituents, the antenna 5 is placed to receive an electric wave from a satellite. The satellite signal reception unit 6 has a memory device 14 to store various types of information and a clock device 15 to clock a positioning time instant, and performs signal demodulation processing on the received electric wave to calculate a current position of this satellite signal receiver.

The communication unit 13 conducts communication with a certain external system in such a manner that it not only receives a positioning request from the external system but also transmit to the external system date of a calculated current position. The power switching unit 4 turns on/off power supplied from the power supply 3 to both the satellite signal reception unit 6 and the timer 11. The control unit 12 controls the operation of each unit. A time instant to turn on/off the power switching unit 4 is controlled by the control unit 12 based on information involving an elapsed time measured by the timer 11.

Figure 3:
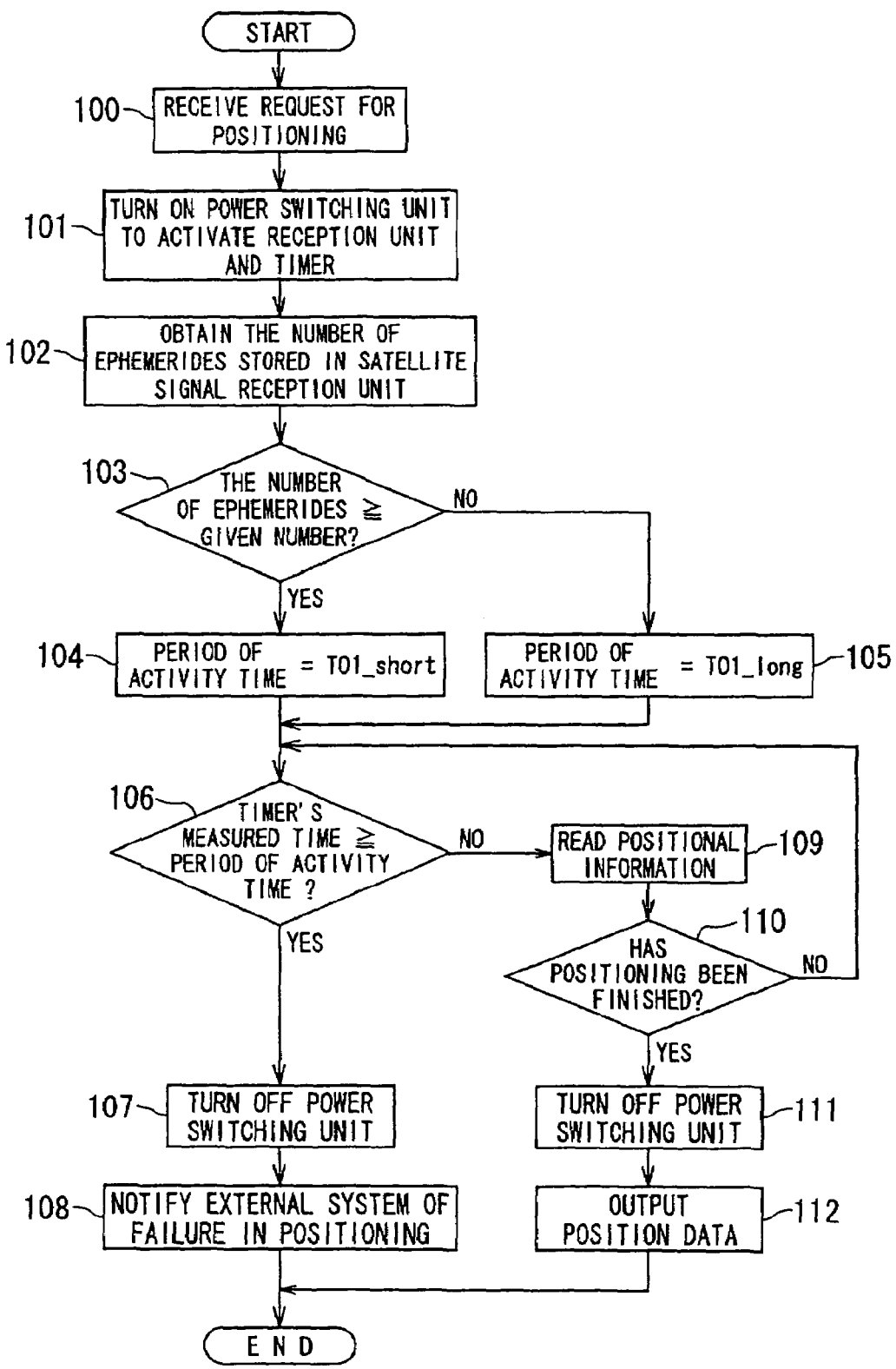
FIG. 3 is a flowchart depicting control of power in the satellite signal receiver according to the first embodiment.

The operation of the satellite signal receiver in accordance with the first embodiment of the present invention will now be described in conjunction with FIGS. 2 and 3. FIG. 3 is a flowchart showing power control conducted in the satellite signal receiver. The control unit 12 executes the processing shown in FIG. 3.

When the control unit 12 receives a request for positioning from an external system through the communication unit 13 (step 100), the control unit 12 turns on the power switching unit 4 to activate both the satellite signal reception unit 6 and the timer 11 (step 101).

By the way, the positioning of the satellite signal receiver is not always possible, and it mostly depends on circumstances to receive the electric waves from satellites. Thus, a period of activity time (a period to time-out) counted from the turn-on of the power switching means 4 to the calculation of a current position of this satellite signal receiver (positioning), specifically, the output of positional information from the satellite signal reception unit 6, is specified in advance. A period of time to the expected next positioning usually varies depending on the number of ephemerides, which is stored by the memory device 14 of the satellite signal reception unit 6 under continuous supply of power from the power supply 3.

Therefore, the control unit 12 acquires information in relation to the number of ephemerides stored by the memory device 14 (Step 102), then determines if there is any difference between the number of ephemerides and a given threshold of number (step 103). Depending on these determined results, the control unit 12 performs a process to change the period of activity time from a time instant at which the power supply switch unit 4 is turned on to a time instant when the control unit 12 acquires positioning information.

In the example of FIG. 3, the period of activity time is specified as T01#short when the number of ephemerides is equal or larger to or than its given threshold (step 104). In contrast, the period of activity time is specified as T01#long (>T01#short) when the number of ephemerides is smaller than the threshold (step 105). Alternatively, this determination may involve three or more stages with two or more pieces of thresholds.

Subsequently, the control unit 12 compares a period of elapsed time measured by the timer 11 with the period of activity time (step 106). When the measured period of elapsed time becomes equal or larger to or than the period of activity time with no calculation of a current position of this satellite signal receiver made by the satellite signal reception unit 6, the control unit 12 regards the positioning as being impossible. In this case, the control unit 12 turns off the power switching unit 4 (step 107), then notifies the not-shown external system of an unsuccessful positioning through the communication unit 13 (step 108).

In contrast, in cases where the period of elapsed time measured by the timer 11 is smaller than that of the period of activity time, the control unit 12 tries to acquire positioning information from the satellite signal reception unit 6 (step 109). Then the control unit 12 begins a process to determine whether the positioning has been finished or not (step 110). When the positioning has been finished, the control unit 12 sends an "off" commands to the power switching unit 4 (step 111), and outputs the positioning information to the not-shown external system via the communication unit 13 (step 112). If the positioning has not been finished yet, the control unit 12 returns to the process at step 106 to repeat the foregoing processing.

As explained above, in the satellite signal receiver according to the first embodiment of the present invention, the period of activity time is adjusted depending on information about the number of ephemerides stored by the memory device of the satellite signal reception unit. Thus the period of activity time can be approached or made to agree to or with a remaining period of time to the next positioning to be expected as closer as possible. It is therefore possible to shorten a period of time to power the satellite signal reception unit under a condition the positioning cannot be conducted, thus reducing useless consumption of the power.

Second Embodiment

Figure 4:
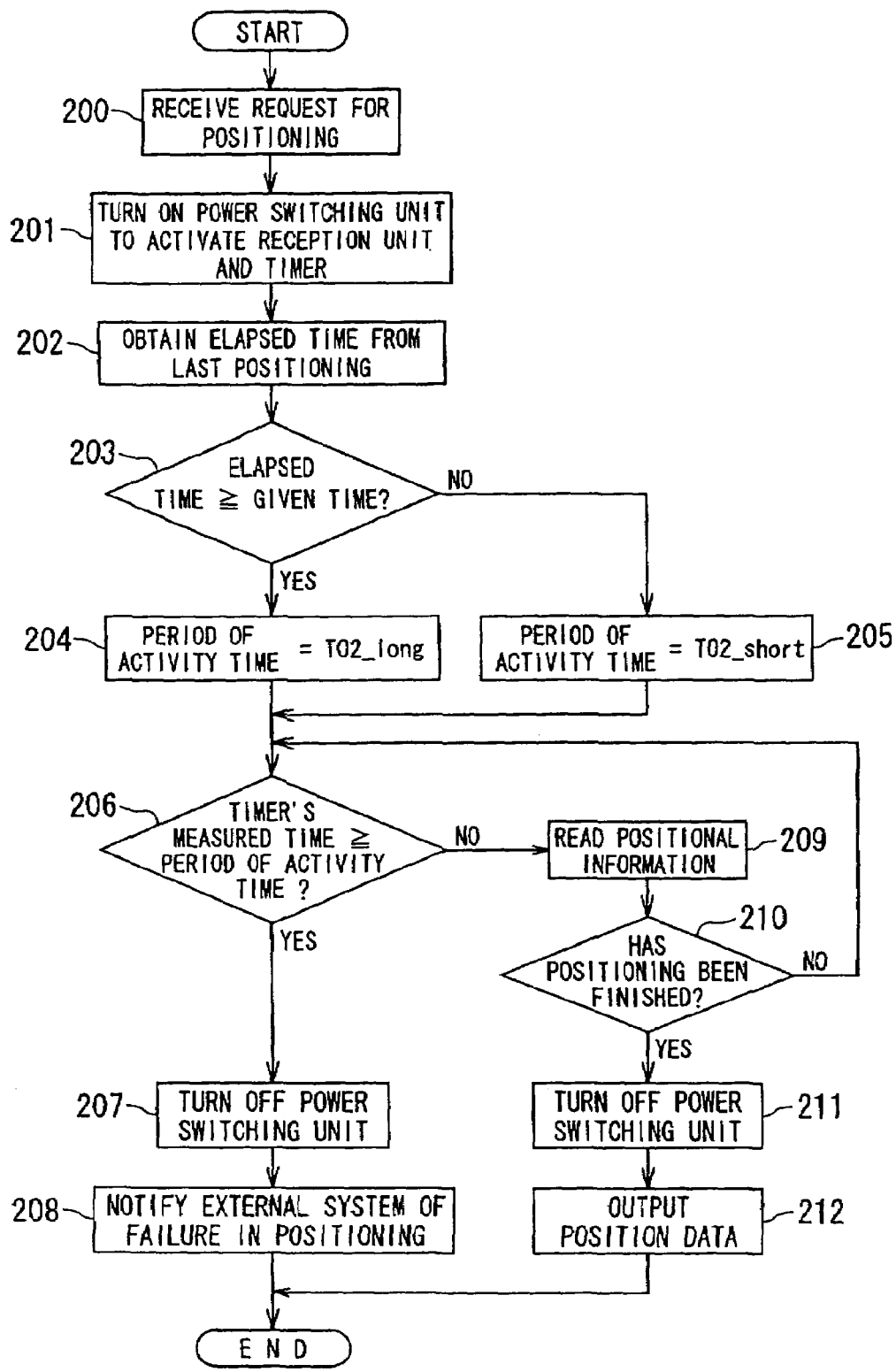
FIG. 4 is a flowchart depicting control of power in the satellite signal receiver according to the second embodiment.

Referring to FIGS. 2 and 4, a second embodiment of the present invention will now be described.

A satellite signal receiver according to the second embodiment differs only in that the control unit 12 and the satellite signal reception unit 6 are constructed to perform a further series of processing different from that in the first embodiment. The remaining configuration and operations of this satellite signal receiver are identical to those in the first embodiment, so the differences with respect to the processing and operations are mainly described.

FIG. 4 is a flowchart showing power control for the satellite signal receiver according to the second embodiment, which is executed by both of the control unit 12 and the satellite signal reception unit 6.

When receiving a request for positioning issued outside through the communication unit 13 (step 200), the control unit 12 turns on the power switching unit 4 in order to activate both of the satellite signal reception unit 6 and the timer 11 (step 201).

By the way, a period of elapsed time counted from a time instant when the clock device 15 counted a positioning time at the last positioning conducted by the satellite signal reception unit 6 has also influence on a period of time to the next positioning to be expected. Considering this fact, in the satellite signal reception unit 6 of the present embodiment, a time instant clocked by the clock device 15 at a certain positioning is memorized by the memory device 14.

Therefore, based on the current time instant clocked by the incorporated clock device 15 to which the power supply 3 supplies power anytime and the last positioning time instant memorized by the memory device 14, the satellite signal reception unit 6 calculates a period of elapsed time from the last poisoning time instant (step 202). The calculated period of elapsed time is sent to the control unit 12.

Responsively to reception thereof, the control unit 12 will move to processing to adjust the period of activity time counted from a time instant when the power is turned on to a time instant when position information is obtained (step 203). Specifically, it is determined whether or not the calculated period of elapsed time from the last positioning is equal or larger to or than a given threshold set for the period.

In the example of FIG. 4, the period of activity time is specified as T02#long when the period of elapsed time is equal or larger to or than its given threshold (step 204). In contrast, the period of activity time is specified as T02#short (<T02#long) when the period of elapsed time is smaller than the threshold (step 205). Alternatively, this determination may involve three or more stages with two or more pieces of thresholds.

Subsequently the control unit 12 determines whether or not the period of elapsed time measured by the timer 11 is equal or larger to or than the period of activity time (step 206). If the period of elapsed time measured by the timer 11 is equal or larger to or than the period of activity time with no calculation of a current position of this satellite signal receiver, the control unit 12 regards the positioning as being impossible. In this case, the control unit 12 turns off the power switching unit 4 (step 207), then notifies the not-shown external system of an unsuccessful positioning through the communication unit 13 (step 208).

In contrast, in cases where the period of elapsed time measured by the timer 11 is smaller than that of the period of activity time, the control unit 12 tries to acquire positioning information from the satellite signal reception unit 6 (step 209). Then the control unit 12 begins a process to determine whether the positioning has been finished or not (step 210). When the positioning has been finished, the control unit 12 sends an "off" commands to the power switching unit 4 (step 211), and outputs the positioning information to the not-shown external system via the communication unit 13 (step 212). If the positioning has not been finished yet, the control unit 12 returns to the process at step 206 to repeat the foregoing processing.

As explained above, in the satellite signal receiver according to the second embodiment of the present invention, the period of activity time is adjusted depending on a period of time elapsing from the last positioning. Thus the period of activity time can be approached or made to agree to or with a remaining period of time to the next positioning to be expected as closer as possible, thereby a period of time to power the satellite signal reception unit being shortened. Useless consumption of the power can be suppressed.

Third Embodiment

Figure 5:
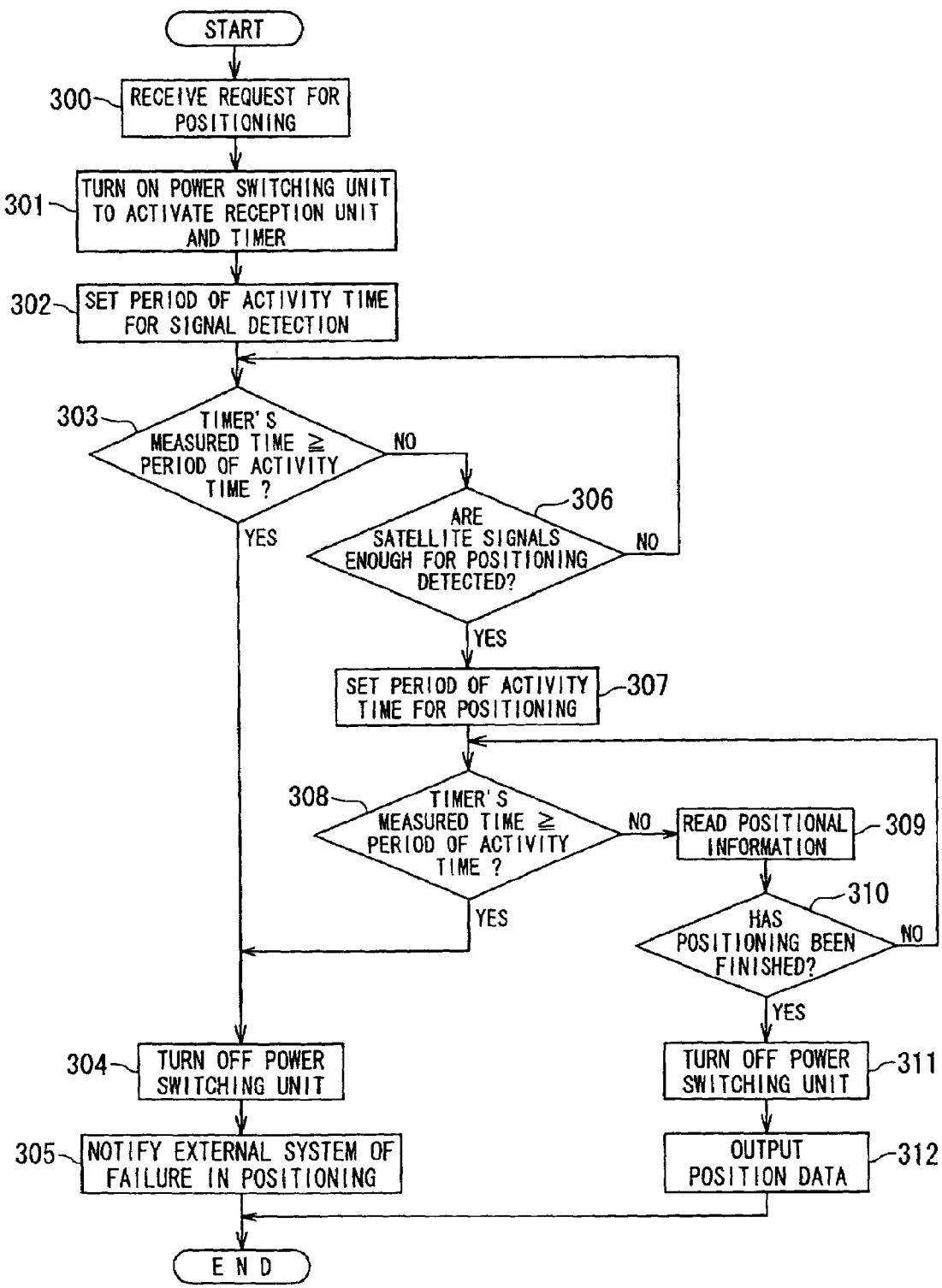
FIG. 5 is a flowchart depicting control of power in the satellite signal receiver according to the third embodiment.

Referring to FIGS. 2 and 5, a third embodiment of the present invention will now be described.

A satellite signal receiver according to the third embodiment differs only in that the control unit 12 and the satellite signal reception unit 6 are constructed to perform further processing different from that in the first embodiment. The remaining configuration and operations of this satellite signal receiver are identical to those in the first embodiment, so the differences with respect to the processing and operations are mainly described.

FIG. 5 is a flowchart showing power control for the satellite signal receiver according to the third embodiment, which is executed by both of the control unit 12 and the satellite signal reception unit 6.

When receiving a request for positioning issued outside through the communication unit 13 (step 300), the control unit 12 turns on the power switching unit 4 in order to activate both of the satellite signal reception unit 6 and the timer 11 (step 301).

The calculation of a current position (i.e., positioning) requires that the signals from a given number of satellites necessary for the positioning be detected. In consideration of this, in this embodiment, a period of activity time for signal detection is specified (step 302). Such period of signal-deception activity time is counted from at a time instant when the power switching unit 4 is turned on to a time instant when the signals from the given number of satellites necessary for the positioning are detected.

Then it is determined whether or not a period of elapsed time measured by the timer 11 is equal or larger to or than the period of signal-deception activity time (step 303). IF the determination is YES at step 303 (the signals from the given number of satellites necessary for the positioning have not been detected), the control unit 12 turns off the power switching unit 4 (step 304), then notifies the not-shown external system of an unsuccessful positioning through the communication unit 13 (step 305).

By contrast, if the determination is NO at step 303 (the signals from the given number of satellites necessary for the positioning have been detected within the period of signal-detection activity time), it is then determined whether or not the number of received satellite signals is equal or larger to or than a necessary number (step 306). In cases the number of received satellite signals is equal or larger to or than the necessary number, a period of positioning activity time, which is counted from the turn-on of the power to positioning, is specified (step 307). However, if the number of received satellite signals is lower than the necessary number, the processing is returned to step 303.

Subsequently the control unit 12 determines whether or not the period of elapsed time measured by the timer 11 is equal or larger to or than the period of positioning activity time (step 308). If the period of elapsed time measured by the timer 11 is equal or larger to or than the period of positioning activity time, the control unit 12 regards the positioning as being impossible. In this case, in the same manner as above, the control unit 12 turns off the power switching unit 4 (step 304), then notifies the not-shown external system of an unsuccessful positioning through the communication unit 13 (step 305).

In contrast, in cases where the period of elapsed time measured by the timer 11 is smaller than that of the period of positioning activity time, the control unit 12 tries to acquire positioning information from the satellite signal reception unit 6 (step 309). Then the control unit 12 begins a process to determine whether the positioning has been finished or not (step 310). When the positioning has been finished, the control unit 12 sends an "off" commands to the power switching unit 4 (step 311), and outputs the positioning information to the not-shown external system via the communication unit 13 (step 312). If the positioning has not been finished yet, the control unit 12 returns to the process at step 308 to repeat the foregoing processing.

As explained above, in the satellite signal receiver according to the third embodiment of the present invention, the period of positioning activity time is specified to regulate an interval from the turn-on of the power to the detection of all the signals necessary for the positioning. This makes it possible to decide a condition in which the positioning is impossible. Useless consumption of the power can be suppressed.

Fourth Embodiment

Figure 6:
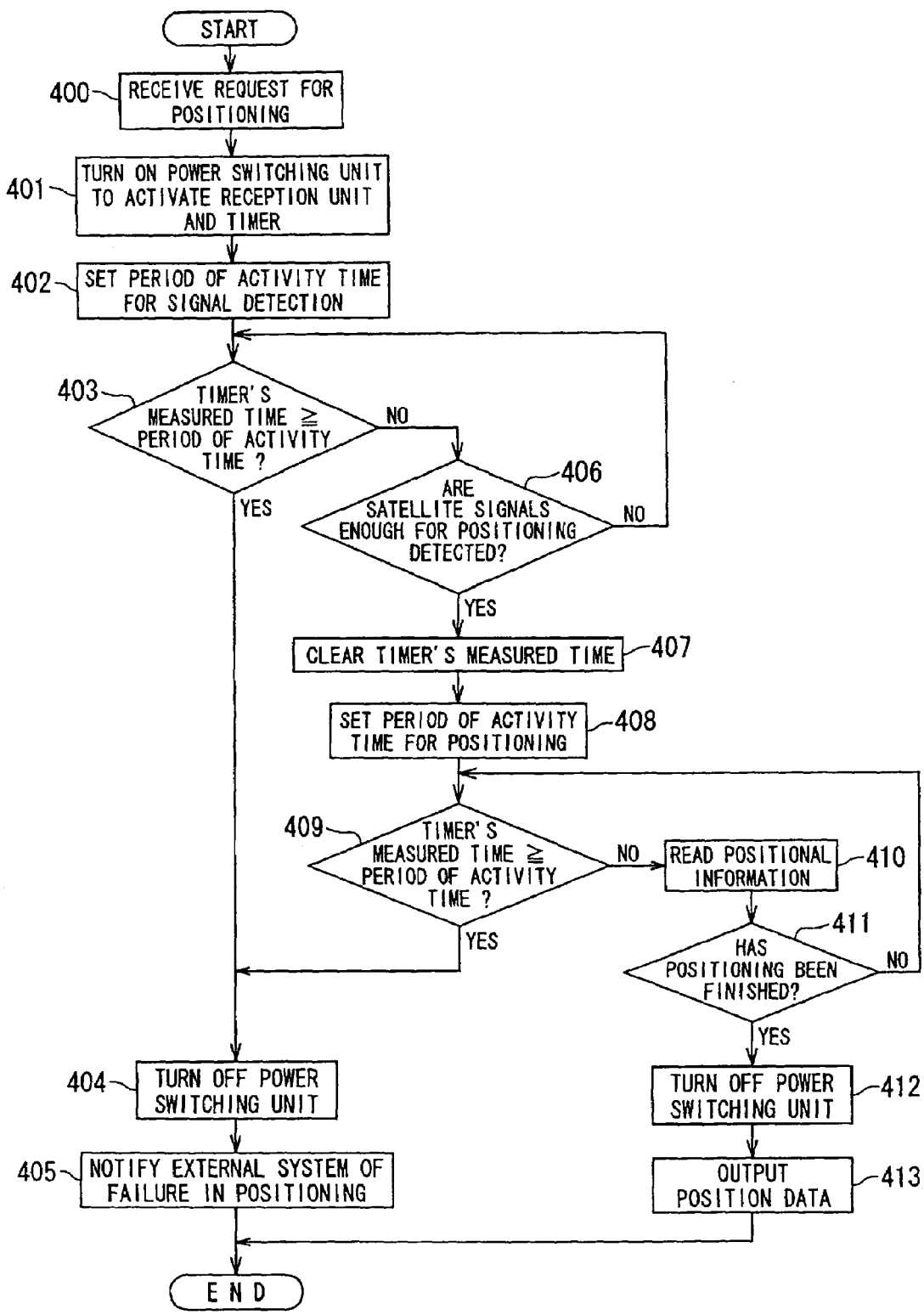
FIG. 6 is a flowchart depicting control of power in the satellite signal receiver according to the fourth embodiment.

Referring to FIGS. 2 and 6, a fourth embodiment of the present invention will now be described.

A satellite signal receiver according to the fourth embodiment differs only in that the control unit 12 and the satellite signal reception unit 6 are constructed to perform further processing different from that in the first embodiment. The remaining configuration and operations of this satellite signal receiver are identical to those in the first embodiment, so the differences with respect to the processing and operations are mainly described.

FIG. 6 is a flowchart showing power control for the satellite signal receiver according to the fourth embodiment, which is executed by both of the control unit 12 and the satellite signal reception unit 6. The processing shown in FIG. 6 is only different in step 407 from that shown in FIG. 5.

In other words, in FIG. 6, when the number of received satellite signals is equal or larger to or than the necessary number for positioning, the control unit 12 clears the count of the timer 11 (step 407), then specifies a period of activity time starting from the detection of the signals to the next positioning (step 408).

As explained above, the satellite signal receiver according to the fourth embodiment of the present invention adopts a period of activity time starting from the detection of all satellite signals necessary in number for positioning to the positioning, during which time the power is turned on. Thus the period of activity time can be approached or made to agree to or with a remaining period of time to the next positioning to be expected as closer as possible, thereby a period of time to power the satellite signal reception unit being shortened. Useless consumption of the power can be suppressed.

Fifth Embodiment

Figure 7:
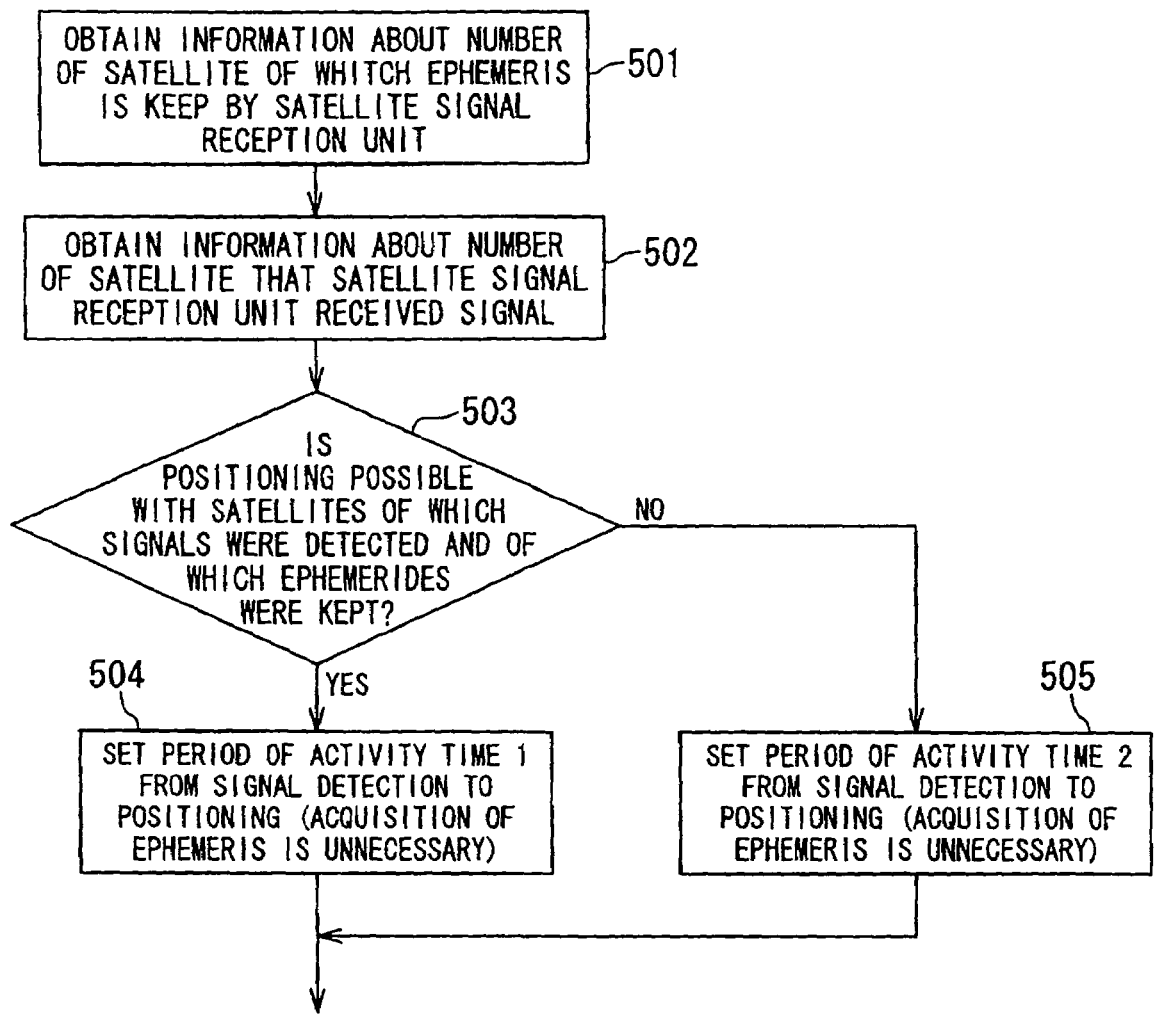
FIG. 7 is a flowchart depicting specification of a period of active time necessary for power control conducted in the satellite signal receiver according to the fifth embodiment.

Referring to FIGS. 2 and 7, a fifth embodiment of the present invention will now be described.

A satellite signal receiver according to the fifth embodiment differs only in that the control unit 12 and the satellite signal reception unit 6 are constructed to perform further processing different from that in the first embodiment. The remaining configuration and operations of this satellite signal receiver are identical to those in the first embodiment, so the differences with respect to the processing and operations are mainly described.

FIG. 7 is a flowchart showing power control for the satellite signal receiver according to the fifth embodiment, which is executed by both of the control unit 12 and the satellite signal reception unit 6. The processing shown in FIG. 7 corresponds to the processing expressed by steps 406 to 408, which is a specification process of the period of activity time that starts from the signal detection to positioning. The remaining part of the processing, though not shown in FIG. 7, is identical to that shown in FIG. 6.

As shown in FIG. 7, from the satellite signal reception unit 6, the control unit 12 obtains information about the numbers of satellites of which ephemeredes are memorized (step 501), then obtains information about the numbers of satellites from which signals are acquired (step 502). Then determined is if or not only satellites from which the signals have been received and ephemerides have been acquired are enough for calculation of positioning (step 503). If the determination is YES, a shorter period of activity time 1 is specified, because it will be no longer necessary to acquire data to the ephemeris (step 504). But the determination is NO, that is, the present satellites of which signals have been detected and of which ephemerides have been acquired are still short of satellites, a longer period of activity time 2 (> the period of activity time 1) is specified, for more ephemerides should be acquired (step 505).

In this way, the satellite signal receiver of this fifth embodiment is configured to adjust a period of activity time starting from the signal detection of all satellites necessary in number for positioning to the positioning, depending on whether or not the positioning requires acquisition of more ephemerides. Hence, the period of activity time can be close or made agree to or with a remaining period of time to the next positioning to be expected. Accordingly, the power is avoided from being consumed uselessly.

Sixth Embodiment

Figure 8:
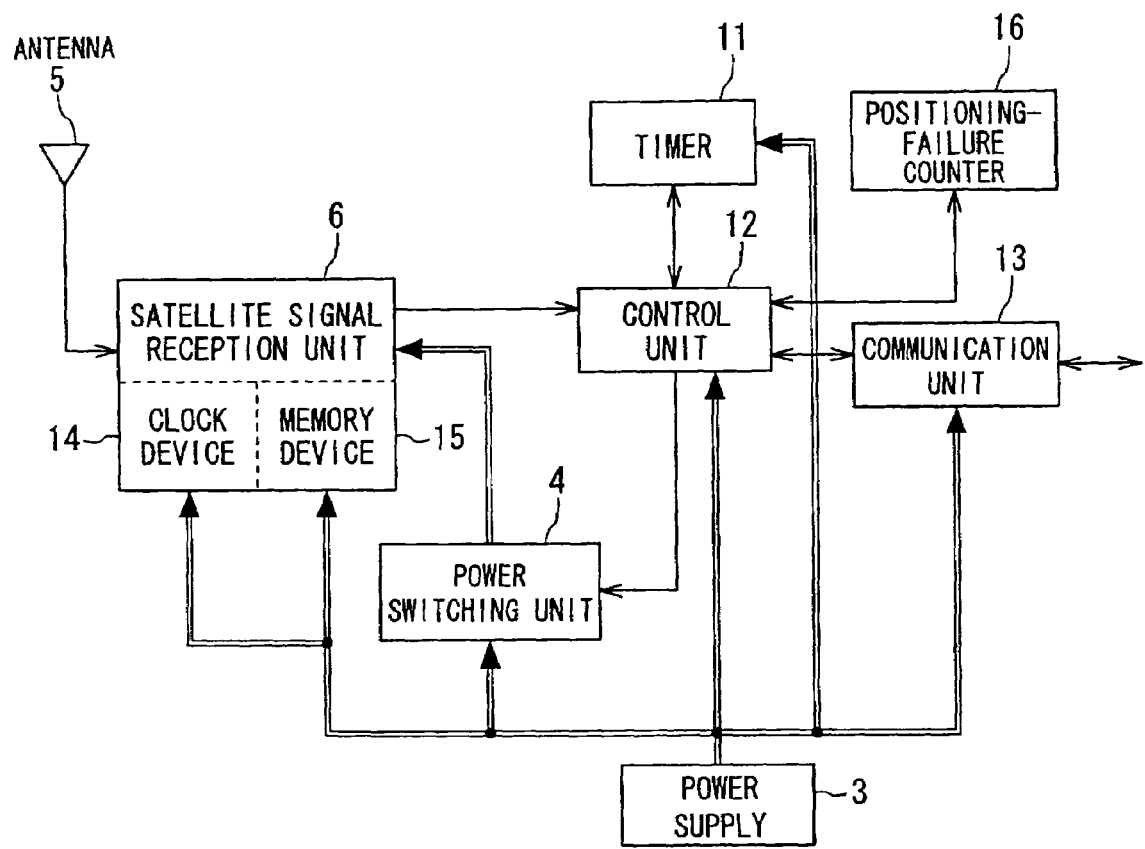
FIG. 8 is a block diagram showing the configuration of a satellite signal receiver employed in a sixth and seventh embodiments of the present invention.
Figure 9:
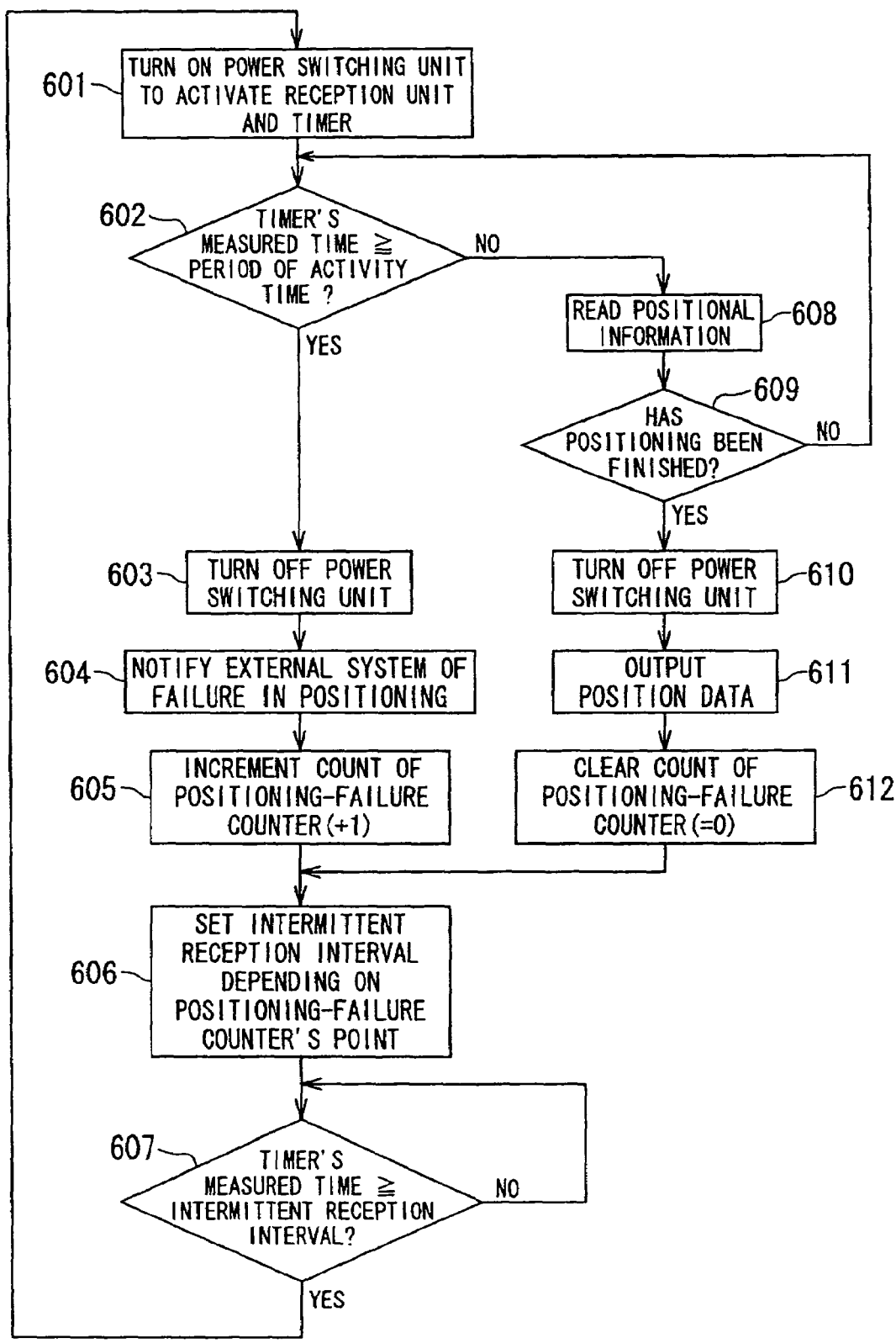
FIG. 9 is a flowchart depicting control of power in the satellite signal receiver according to the sixth embodiment.

Referring to FIGS. 8 and 9, a sixth embodiment of the present invention will now be described.

FIG. 8 shows the configuration of a satellite signal receiver according to the sixth embodiment. Compared to the constituents shown in FIG. 2, a positioning-failure counter 16 of which count shows the number of failures in positioning is added to be connect to the control unit 12 and a power supply line from the power supply 3 to the timer 11 is added. The control unit 12 is configured to perform a different type of processing shown in FIG. 9. The remaining constituents and processing are the same or identical as or to those in the first embodiment, so only such different elements will now be described mainly.

FIG. 9 outlines power control conducted by the satellite signal receiver in the sixth embodiment.

In the present embodiment, the satellite signal reception unit 6 is made to operate in an intermittent manner, so that the timer always receives power from the power supply 3 through the added power supply line.

Thus, the timer 11 is subject to the determination whether or not a period of elapsed time measure by the timer 11 is equal or lager to or than a predetermined intermittent reception interval (step 607). When the determination is YES, that is, a period of elapsed time measure by the timer 11 is equal or lager to or than the intermittent reception interval, the control unit 12 turns on the power switching unit 4 to activate the satellite signal reception unit 6 as well as clear a count of the timer 11 (step 601).

Then it is determined if the period of elapse time measure by the timer 11 is equal or larger to or than a period of activity time (step 602). If the determination is YES at step 602, the control unit 12 regards the positioning as being impossible. In this case, the control unit 12 turns off the power switching unit 4 (step 603), then notifies the not-shown external system of an unsuccessful positioning through the communication unit 13 (step 604). The control unit 12 then increments a count of the positioning-failure counter 16 (the count is increased by one) (step 605).

By contrast, if the determination is NO at step 602 (the period of elapsed time measure by the timer 11 is less than the period of activity time), the control unit 12 tries to read positional information from the satellite signal reception unit 6 (step 608).

Then the control unit 12 begins a process to determine whether the positioning has been finished or not (step 609). When the positioning has been finished, the control unit 12 sends an "off" commands to the power switching unit 4 (step 610), and outputs the positioning information to the not-shown external system via the communication unit 13 (step 611). In this case, a count of the positioning-failure counter 16 is set to zero (cleared; step 612). If the positioning has not been finished yet, the control unit 12 returns to the process at step 602 to repeat the foregoing processing.

After the positioning-failure counter 16 has been set at step 605 or step 612, the intermittent reception interval is adjusted depending on counts of the positioning-failure counter 16 (step 606). For instance, the internal is set to 10 minutes when a positioning-failure counter's count is 2 or more, while it is set to 5 minutes when a positioning-failure counter's count is less than 2. As an alternative example, the period of activity time may be changed according to counts of the positioning-failure counter 16.

After adjustably setting the intermittent reception signal, the control unit 12 determines, like the above, whether or not the period of elapsed time measured by the timer 11 is equal to or over the intermittent reception interval that has been adjusted above (step 607). This determination is repeated if NO is kept at step 607.

If the determination is YES, that is, the period of elapsed time measured by the timer 11 reaches the intermittent reception interval, the processing is moved to step 601 to repeat the foregoing process. Namely, the power switching unit 4 is turned on to activate the satellite signal reception unit 6 as well as clear the count of the timer 11. As stated above, the satellite signal receiver of this sixth embodiment performs the power control similar to the first embodiment under intermittent operations of the satellite signal reception unit 6. In this receiver, when the positioning cannot be conducted in series, the intermittent operation interval is widened. As a result, it is therefore possible to shorten a period of time to power the satellite signal reception unit under a condition the positioning cannot be conducted, thus reducing useless consumption of the power.

Seventh Embodiment

Figure 10:
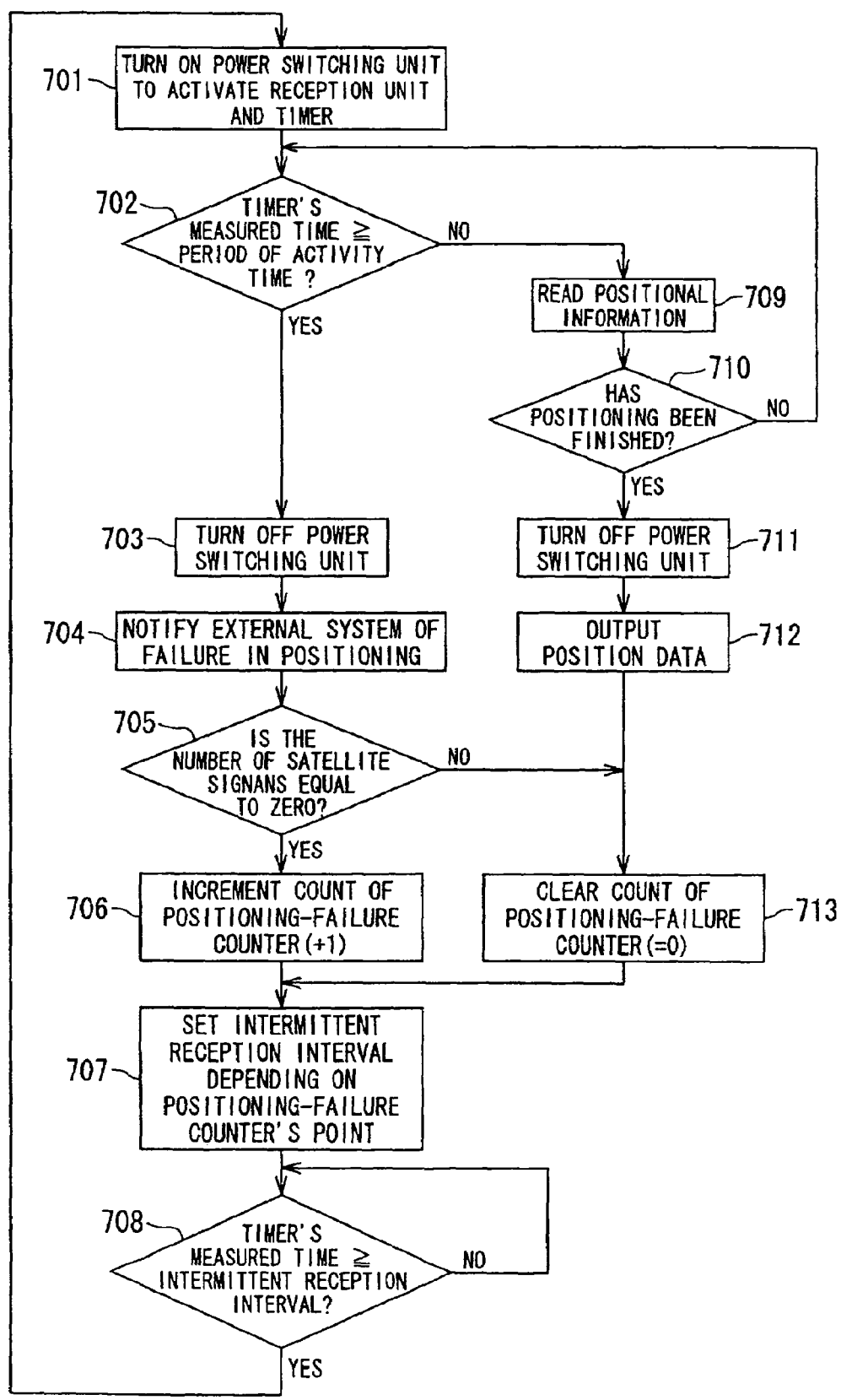
FIG. 10 is a flowchart depicting control of power in the satellite signal receiver according to the seventh embodiment.

Referring to FIGS. 8 and 10, a seventh embodiment of the present invention will now be described.

FIG. 10 outlines power control conducted by the satellite signal receiver in the seventh embodiment. The processing in FIG. 10 is almost the same as that shown in FIG. 9 except that step 705 is added after step 704 corresponding to step 604 in FIG. 9.

Specifically, after notifying the not-shown external system of an unsuccessful positioning through the communication unit 13 (step 704), the control means 11 determines whether or not the number of satellites of which signals have been received is zero (step 705). If the determination is YES, that is, none of signals have been received from any satellites, the positioning-failure counter 16 is incremented (step 706). In contrast, at least one signal has been received from any satellite (YES at step 705), the positioning-failure counter 16 is cleared to zero in its count (step 713).

As a result, in the satellite signal receiver according to the seventh embodiment, the power control identical to that explained in the first embodiment is performed with the satellite signal reception unit operating intermittently. In this intermittent satellite signal reception, there is a possibility that any satellite signal cannot be received over a plurality of successive intermittent receptions. Such occasions occur when, for example, the receiver is located at particular places, such as being among city's buildings, which make the reception of electric waves impossible or fairly difficult. In such a case, a period of time to supply the power is shortened through the processing at step 705, thus saving the power consumption.

For the sake of completeness, it should be mentioned that the various embodiments explained so far are not definitive lists of possible embodiments. The expert will appreciates that it is possible to combine the various construction details or to supplement or modify them by measures known form the prior art without departing from the basic inventive principle.

What is claimed is:

1. A satellite signal receiver comprising:
    a satellite signal reception unit for intermittently calculating a current position of the satellite signal receiver at adjustable intermittent intervals by using an electric wave from a satellite;
    a timer for clocking an elapsed time every time when the current position of the satellite signal receiver is calculated; and
    power-on/off controlling means for intermittently controlling an on/off state of power supplied to the satellite signal reception unit on the basis of information including the elapsed time clocked by the timer every time when the current position of the satellite signal receiver is calculated.

2. The satellite signal receiver according to claim 1, wherein the power-on/off controlling means comprises means for determining whether or not the elapsed time clocked by the timer reaches a given period of time with no completion of a positioning process and means for commanding the off state of the power when the elapsed time reaches the given period of time with no completion of the positioning process.

3. The satellite signal receiver according to claim 1, wherein the power-on/off controlling means comprises a counter for counting the number of failures in calculating the current position and means for adjusting the intermittent intervals depending on the count of the counter.

4. The satellite signal receiver according to claim 3, wherein the adjusting means is configured to make the intermittent intervals longer when it is impossible to calculate the current position in succession.

5. The satellite signal receiver according to claim 3, wherein the adjusting means is configured to make the intermittent intervals longer when the satellite signal reception unit is impossible to receive the electric wave from any satellite in succession.

* * * * *